Sept. 7, 1937.     W. M. SCOTT, JR     2,092,592
TRIPPING MEANS FOR CIRCUIT INTERRUPTERS
Filed Oct. 20, 1936     2 Sheets-Sheet 2

INVENTOR.
William M. Scott Jr
BY
Cornelius D. Ehret
ATTORNEY.

Patented Sept. 7, 1937

2,092,592

UNITED STATES PATENT OFFICE 2,092,592

TRIPPING MEANS FOR CIRCUIT INTERRUPTERS

William M. Scott, Jr., Philadelphia, Pa., assignor to I-T-E Circuit Breaker Company, Philadelphia, Pa., a corporation of New Jersey Application October 20, 1936, Serial No. 106,522

26 Claims. (Cl. 200—106)

My invention relates to electrical circuit interrupters, and has for an object the provision of a simple, reliable and inexpensive means for tripping a circuit interrupter or automatic circuit breaker upon flow of a predetermined overload current, and upon flow of a current increasing at a predetermined rate.

My invention is particularly useful in connection with circuit breakers utilized to protect motors, generators or any other device or circuit against overload current or currents of short circuit magnitude. In general, in dynamo-electric machinery a normal rise in the current results from a reduction in counter-electromotive force because of increased torque requirements or reduction in field strength whereas abnormal current flow of short circuit magnitude may result from a short circuit caused by a flash-over, failure of insulation, or the like. The rate of rise for normal increase of current is relatively low due to the high inductance of the circuit. On the other hand, for the abnormal conditions the rate of rise of current is very high.

Accordingly it is a further object of my invention to provide a tripping device which discriminates between the normal and abnormal rates of rise of current.

In accord with a further object of my invention, a convenient means is provided to adjust the tripping device to trip in response to predetermined rates of rise of current as well as to the total value of current flowing in the circuit.

Although my invention is not limited thereto, it is particularly applicable to circuit interrupters of high current-carrying capacity, and while it has heretofore been proposed to utilize inductive shunts connected in the circuit of the interrupter for energizing tripping coils, I have found that much was yet to be desired in the elimination of inaccuracies in the calibration of such tripping devices. For example, the inclusion of any shunt in a circuit, together with its associated conductors, introduces electrical joints. These may comprise soldered connections, or the bus bars and conductors may be bolted or clamped together. Frequently the work involved in the foregoing is ordinarily done in the field and because of inaccuracy or variation in the degree of perfection of the work leaves at large the precise value of the resistance of the shunts, and of the tripping circuits, since that resistance will be greatly affected by the electrical characteristics of the joints. The pressure between adjoining conductors, the area of the contact surface, and the nature of the soldered or brazed joint, each has a substantial bearing upon the division of the current. Moreover the additional leads and structural features require substantial space and tend to increase the overall dimensions of the circuit breaker.

Accordingly, it is a further object of my invention to provide a compact tripping means for the circuit interrupter which forms an integral part thereof, and whose electrical resistance is entirely independent of any joints or connections of any kind.

In carrying out my invention, in one form thereof, the conductor, or conductors, forming one current path to the circuit breaker, is, or are, divided to form parallel current paths of differing conductances. Upon flow of a slowly rising current, the current will divide between the several paths in proportion to their respective conductances. Associated with one of the current paths, ordinarily with the one of lower or lowest conductance, or high resistance, is an electromagnetic field structure whose core surrounds that current path and whose armature is movable in response to a predetermined current to trip the circuit breaker. Preferably an adjusting means for changing the position of the armature with respect to the coacting field pole may be provided for altering the value of the current required to attract the armature. A convenient scale, marked with current values, may be mounted adjacent the armature to assist in the selection of the current value which will trip the circuit breaker.

To insure the tripping of the breaker in a minimum time upon rapidly rising currents, a plurality of laminations formed of magnetizable material, such as transformer steel, encircles the other current path to form a substantially closed magnetic circuit. Due to the magnetizable material, a substantial counter-electromotive force is generated upon the occurrence of a fault, the effect of which is greatly to increase, and make effective, the proportion of the current in the path including the tripping magnet. By varying the number of laminations and the air gaps between them, the required rate of rise of current to trip the circuit breaker may be adjusted as desired.

For a complete understanding of my invention reference may now be had to the drawings, in which:

Fig. 5 is a perspective view of one of the magnetizable laminations of Fig. 3.

Figure 1:
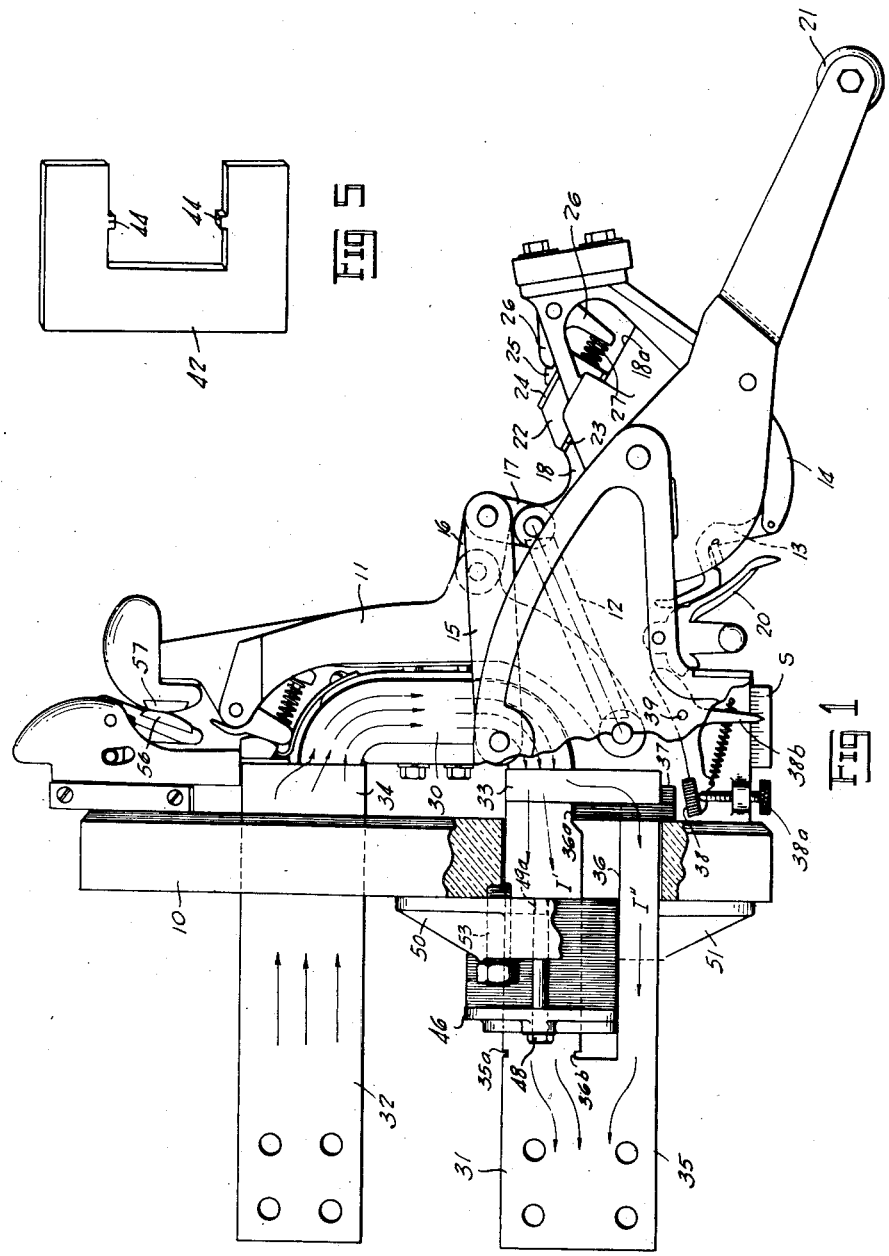
Figure 1 is a side elevation, partly in section, of a circuit breaker embodying my invention.

Referring to the drawings, I have shown my invention in one form as applied to a circuit interrupter mounted upon a panel 10. As shown, the movable contact structure 11 is retained against the bias of a powerful spring 12 in its closed circuit position by means of latching mechanism including an auxiliary latch 13 which controls a main latch 14, and by means of a double toggle arrangement comprising links 15, 16, 17 and an actuating member 18. The particular form of operating mechanism forms no part of the present invention though it preferably is of the type shown in my Patent No. 2,025,781, dated December 31, 1935.

It will be sufficient here to say the movable contact structure 11 is quickly operated to its open position upon movement of a tripping member 20 to release the auxiliary latch 13. The operating mechanism is trip-free, that is, when the auxiliary latch 13 is released the circuit interrupter will open irrespective of the position of, and without interference from, the operating member 21. after the circuit interrupter is opened, the operating member 21 may be rotated in a counter-clockwise direction to a predetermined position and then returned to the position shown in Fig. 1, the actuating member 18 and the links 15, 16 and 17 cooperating to return the movable contact structure 11 to the closed circuit position.

While forming no part of the present invention, the circuit interrupter is provided with an energy absorber, for eliminating hammer blows incident to the opening of the circuit breaker, of the type described and claimed in co-pending application of George A. Healis, Serial No. 98,562, filed August 29, 1936 and assigned to the same assignee as the present invention.

Briefly the energy absorber comprises a brake block 22 arranged to be displaced by the movable contact structure 11 as it approaches its open position. The block 22, by reason of friction material 23 movable along plane surface 18a of actuating member 18, and by reason of friction material 24 engaged by a braking member 25, develops substantial opposition to movement. By means of a crank arm 26 and spring 27, the amount of energy absorbed and dissipated, besides being proportional to the kinetic energy stored in the parts as they move to their open circuit position, increases as the block 22 is displaced by structure 11.

In the closed circuit position of the circuit breaker, a bridging member 30, forming a part of the movable contact structure 11, completes a low resistance circuit between the stationary contact structures 31 and 32. Each contact structure comprises one or more flat conductors or bus bars integrally secured, as by welding, brazing, or solder-sweating, to stationary contact members 33 and 34. By way of example, I have shown the structure 31 as comprising eight duplicate conductors or bus bars 35 respectively embedded within, and joined as by welding or solder-sweating to the sides of, recesses 33a of the member 33. Between the opposite ends of each bus bar 35 is an elongated slot 36, one enlarged end 36a of which is arranged to receive a plurality of duplicate magnetizable members or laminations 37 which form the field structure or core of an electromagnet whose armature 38, pivoted at 39, is operable to release the auxiliary latch 13 of the circuit interrupter. By means of an adjustable stop 38a the position of the armature 38 with respect to the core 37 may be selected to predetermine the value of current required to attract the armature to trip the circuit breaker. Thus a scale S may be graduated to show approximate values of current required for a range of positions of an index 38b secured to and movable with armature 38.

At the opposite end of the slot 36 is an upwardly extending notch 36b arranged in alignment with a notch 35a extending inwardly from the upper edge of the conductor 35. The several recesses 36a, 36b, 35a, and the slots 36 of the eight conductors of structure 31 are arranged in alignment and spacers 40 are interposed between adjacent conductors to increase the rigidity of the assembly.

By provision of the slots 36 each conductor, intermediate its ends, is divided into two current paths I' and I''. As shown, the path I' has about twice the cross-sectional area as path I'' and therefore a steady current divides in the ratio of two-thirds through path I' and one-third through path I''. By varying the conductances of the two paths, as by change of cross-sectional areas of the conductors, any desired division of current may be readily obtained.

The core 37 forms a partially closed magnetic circuit around the current path I''. Upon flow of a predetermined current through path I'', sufficient magnetic attractive effort is produced to lift the armature 38 to trip the circuit interrupter. If 2000 amperes is required in the lower path to trip the interrupter and the normal overload current for the tripping operation is 6000 amperes the aforesaid ratio of conductances will be satisfactory. Whatever may be the selected ratio of conductances, it does not change during the life of the tripping unit since there are no soldered, welded, or other type of connection affecting current distribution in the paths I' and I''.

Upon flow of rapidly rising current, incident to a short circuit or other fault condition, the armature 38 is to be attracted at a lower value of the total current than for a slowly rising current. To this end a plurality of U-shaped magnetizable laminations 42 and 43 form a substantially closed magnetic circuit about the current path I'. A counter-electromotive force is thereby produced whose magnitude depends upon the rate of change of current. For example, if the rate of rise of current is high, the current does not divide between paths I' and I'' in accord with the ratio of their conductances since the counter-electromotive force resulting from the provision of laminations 42 and 43 opposes increase of current flow through the path I'. The inductive counter-electromotive force unbalances the normal ratio of division of current in the two paths so that a larger percentage of current flows through the path I''.

In a typical device with a ratio of conductances of two to one, and a steady tripping current adjustment of the armature of 10,000 amperes, it was found with a suddenly applied load that the circuit interrupter was tripped to open position with a total current through paths I' and I'' of only 5000 amperes.

Shorter tripping times as aforesaid are highly advantageous since the circuit interrupter distinguishes between normal and abnormal overloads.

By anticipating the abnormal overload the circuit interrupter is opened before the current has time to rise to excessively high values.

Since the core 37 and armature 38 provide a magnetic circuit about the path I″, it is necessary, in order to be responsive to the rate of rise of current, to have a substantially greater cross-sectional area of magnetic material encircle the path I′ than the path I″. The number of laminations may be readily increased or decreased to adjust the cross-sectional area of the magnetic path and thereby to control the magnitude of the induced counter-electromotive force.

Each lamination preferably includes inwardly extending projections or lugs 44 complementary to the recesses 35a and 36b and closely fitting between adjacent conductors. These lugs fix the position of the laminations laterally by fitting between adjacent conductors. The air gap between corresponding laminations 42 and 43 may be determined by selecting the proper opening between conductors in which the lugs are inserted. It is not essential that each pair of laminations have the same air gap, and by varying the air gap of the group as a whole further control of the counterelectromotive force is provided. The laminations 42 are individually slid into the recesses 35a and 36b until the projections or lugs 44 are in alignment with the space between selected adjacent conductors and the cross-portion of each lamination is adjacent to, or spaced from, the outer conductor. The laminations are then bodily moved toward the panel 10. Similarly, an equal number of magnetizable laminations 43 are assembled from the opposite side of the structure 31. A clamping yoke 46, Figs. 1 and 2, by means of bolts 48 and 49, is pressed against the groups of laminations to clamp them against the rear side of the panel 10. Any tendency of opposing laminations to move toward each other is resisted by friction between adjacent laminations and by the lugs 44 interlocked with the conductors. As shown, the threaded ends of bolts 48 and 49 cooperate with threaded openings 48a and 49a provided in a pair of panel-reinforcing plates 50 and 51 themselves secured in place by bolts 53 which also serve to clamp the frame of the circuit interrupter mechanism to the panel 10.

Preferably the permeability of the magnetizable laminations 42 and 43 is relatively high. The air gap between adjacent groups 42 and 43 is maintained to insure normal operation, i. e., with normal load currents, below the knee of the magnetization curve to the end that a rapidly rising current will produce a substantial counter-electromotive force. By suitably adjusting the size of the air gap and/or the number of laminations, a current rising at a high and abnormal rate will produce sufficient counter-electromotive force to increase substantially the proportion of current flowing in the tripping path I″. The armature 38 is then operated against its bias to a tripping position in response to a total current flow of magnitude less than is required during existence of normal current conditions.

Figure 3:
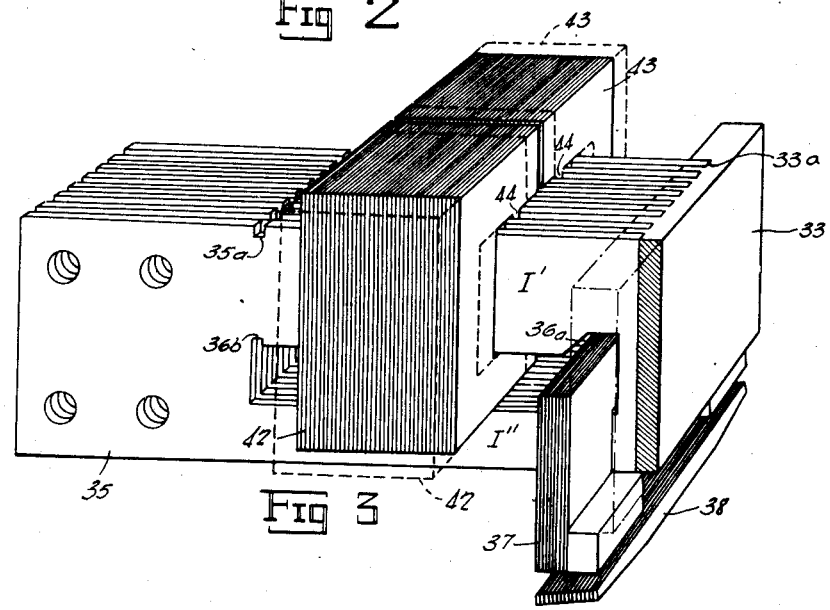
Fig. 3 is a perspective view of the tripping means.
Figure 4:
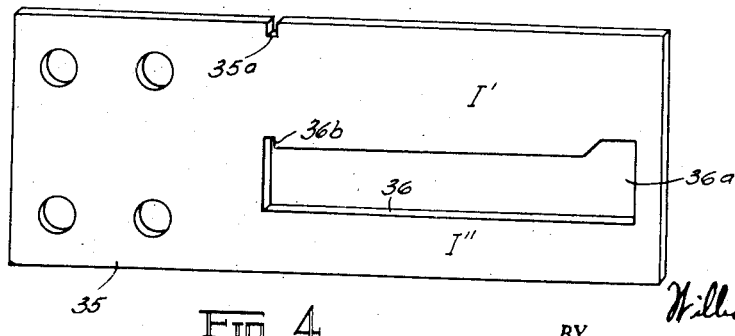
Fig. 4 is a perspective view of one of the conductors of Fig. 3.

If the interrupter is connected in a circuit subject to rapid variation in load, the circuit interrupter might open the circuit even though the total current through the interrupter were less than that which would produce tripping of the breaker under steady current conditions. The effect of the rate of change of current upon the tripping point of the interrupter is readily controlled as explained above. Thus, a number of laminations 43 may be located with their lugs between the outermost pair of conductors to increase the air gap between 42, 43. The positions of the laminations when so located are shown, Fig. 3, by the broken lines. Also by varying the number of laminations, suitably selecting the air gaps, and by adjusting the armature 38 by adjusting means 38a, the circuit interrupter may be adjusted to trip as may be desired and to discriminate between the aforesaid normal variations in load and abnormal variations.

The adjustment of the air gap as mentioned above is readily accomplished by the assembly of the laminations 42, 43 with respect to the structure 31. Obviously the size of the air gap may also be changed by extending or shortening the respective legs of the laminations. Instead of a single lug or projection 44, additional projections may be provided to nest within the openings between each pair of conductors; or, successive laminations may be provided with projections in differing positions, the first projections to engage the space between one pair of conductors and the second projections to engage the space between the next pair of conductors. It is more economical, however, to provide the duplicate laminations 42, 43, which may be used interchangeably, each lamination embracing about four, or a selected number, of the eight conductors comprising the structure 31 which is illustrative of one form of my invention.

The lugs 44, besides their usefulness in predetermining the air gap, also serve mechanically to interlock each of laminations 42, 43 with the rigid conductor assembly or structure 31. In consequence, the magnetic attractive forces, 35 which may be very high with current flow of short circuit magnitude, tending to decrease the air gap as by drawing the opposing laminations 42, 43 together, are effectively resisted. The lugs 44, extending inwardly from each extending leg of every U-shaped lamination 42, 43, are effective to prevent any movement thereof in a direction normal to the current path. The intermediate or connecting-leg of each lamination, when the air gap is a minimum, is preferably proportioned so that its inner edge engages the outer face of one or the other outside conductors of the assembly 31. The spacers 40, of fiber, copper or the like, are preferably coextensive with the magnetizable structures 42, 43, and effectively prevent flexure, bending and deformation of conductors 35 of group 31 due to the action of the magnetic forces discussed above upon the magnetizable structures 42, 43.

Figure 2:
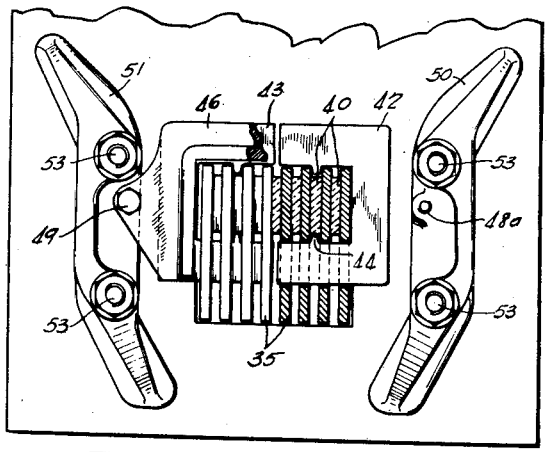
Fig. 2 is a fractional rear elevation, partly in section of the tripping means shown in Fig. 1.

Referring to Fig. 1, if a rapidly rising current flows, a high counter-electromotive force by self-induction produced in the current path I′ forces a greater proportion of the current through the path I″. In other words, the normal division of current is in the same ratio as the conductances of paths I′ and I″ while with a rapidly rising current due to the induced counter-electromotive forces, the division is changed in accord with the magnitudes of said forces.

Since many interrupters are designed to carry very large values of current, the resistances of paths I′ and I″ may be, and usually are very small fractions of an ohm, for example, two and four ten-thousandths of an ohm for each bar. Consequently the slightest change in the resistance of either path greatly affects the current division. In accordance with my invention no changes in current division due to changing resistance can occur since the resistance, or the conductance, depends entirely upon the cross-sectional areas, and lengths of the two paths and not upon connections or joints of any kind.

Continuing with the operation, as soon as the predetermined or pre-selected value of current flows in path I'', and irrespective of the current magnitude of path I', the armature 38 is attracted and operates the tripping member 20 to release the auxiliary latch 13. Thereupon the circuit interrupter, whether of one pole or a plurality of poles, by release of the main latch 14, operates to the open circuit position. During movement of the contact structure 11, the bridging member 30 first disengages stationary contact members 33 and 34 to transfer the current to a pair of arcing contacts 56 and 57. Suitable arc-extinguishing means (not shown) is preferably provided for the rapid extinguishment of arcs incident to the separation of contacts 56 and 57.

As the movable contact structure 11 approaches its fully open position a part thereof engages brake block 22 which, as described above, absorbs and dissipates the kinetic energy of the movable parts to prevent rebound of the contacts and to prevent hammer-blows to the parts.

The circuit-breaker may be re-closed by lifting the handle 21 either manually or automatically, as by a solenoid, or hydraulic operator, to re-set the latches 13 and 14 and by returning the handle 21 to its original position.

While I have shown a particular embodiment of my invention, it will be understood that I do not limit myself thereto, since many modifications may be made, and I, therefore, contemplate by the appended claims to cover any such modifications as fall within the spirit and scope of my invention.

What I claim is:

1. A trip unit for a circuit interrupter comprising a conductor, separated elements of which form parallel current paths, inductive means associated with one of said parallel paths, an electromagnet having an armature and a field structure surrounding another of said parallel-paths, and means mounting said armature for movement in accordance with the magnitude of current flow through said last-named path to a tripping position.

2. In a circuit interrupter, a conductor having two current paths one of which has a greater conductance than the other, magnetizable means associated with the path of greater conductance, magnetizable means associated with said other path, and a member operable upon flow of a predetermined current in said path of least conductance to trip the circuit interrupter.

3. In a circuit interrupter, a conductor having separate current paths in parallel, a core and co-operating armature forming a magnetic circuit about one of said paths, and a second magnetic circuit about another of said paths for controlling, upon flow of a rapidly changing current, the division of current between said paths.

4. In a circuit interrupter, a conductor having a slot dividing an intermediate portion thereof into two current paths, an electromagnet having a core and an armature forming a magnetic circuit about one of said paths, and a second magnetic circuit of substantially lower reluctance than said first-named circuit associated with said other of said paths for producing upon flow of a rapidly rising current a substantial counter-electromotive force to oppose current flow in its associated current path and to increase the current flowing in said other path.

5. In a circuit interrupter, a unitary conductor having between opposite closed ends thereof two separate current paths, a magnet-core and an armature forming a magnetic circuit around one of said paths, and another magnetic circuit around the other of said paths the reluctance of which is adjustable to control the division between said paths of a rapidly changing current.

6. Tripping means for a circuit interrupter comprising a unitary conductor having intermediate its ends a longitudinally extending slot dividing said conductor into two current paths, and magnetizable means associated with each of said paths for controlling the division of current between said paths.

7. In a circuit interrupter, a plurality of conductors, each of them having between opposite ends thereof separate current paths connected in parallel, means connecting corresponding ends of said conductors together, an electro-magnet having a core and an armature forming a magnetic circuit about a plurality of corresponding current paths of said conductors, and a second magnetic circuit associated with a plurality of other corresponding current paths of said conductors for controlling, upon flow of a rapidly changing current, the division of current between said paths.

8. In a circuit interrupter, a plurality of conductors each of them having between opposite ends thereof separate current paths in parallel, means connecting corresponding ends of said conductors together, an electro-magnet having a core and an armature forming a magnetic circuit about a plurality of corresponding current paths of said conductors, and a plurality of magnetizable laminations substantially enclosing the other current path of said conductors, each lamination having projections extending between adjacent conductors.

9. In a circuit interrupter, stationary contact structure therefor comprising a contact block, a plurality of conductors having corresponding ends thereof integrally secured to said block, said conductors having duplicate elongated slots disposed in alignment to divide said conductors into two portions, tripping means for the interrupter including a core member and an armature forming a magnetic circuit surrounding corresponding portions of said conductors on one side of said slots, and magnetizable means associated with the respective portions of said conductors on opposite sides of said slots to form magnetic circuits individual thereto for controlling the flow of current, the reluctance of at least one of said paths being adjustable.

10. An electroresponsive device comprising a plurality of flat conductors spaced apart and disposed parallel to each other, each conductor intermediate its end having a slot dividing it into two current paths, and a plurality of U-shaped magnetizable laminations embracing one of said paths, the respective legs of said laminations having lugs extending between adjacent conductors.

11. An electroresponsive device comprising a plurality of flat conductors spaced apart and disposed parallel to each other, each of said conductors intermediate its ends having a slot dividing it into two current paths, and a plurality of U-shaped magnetizable laminations extending from opposite sides of said conductors substantially to enclose one of said current paths, a plurality of said laminations having projections extending between adjacent conductors.

12. An electroresponsive device comprising a plurality of flat bus bars spaced apart and disposed side by side, a conductor rigidly and electrically connected to corresponding ends of said bus bars, each of said bars having an elongated slot to form parallel current paths through an intermediate portion thereof, a plurality of magnetizable laminations encircling corresponding current paths of a plurality of said bus bars, each of said laminations having lugs extending inwardly between adjacent bus bars, and a plurality of magnetizable laminations encircling the remaining current paths.

13. In a circuit breaker, a tripping device comprising a plurality of flat bus bars spaced apart and disposed side by side, a conductor rigidly and electrically connected to corresponding ends of said bus bars, each of said bars having an elongated slot to form parallel current paths through an intermediate portion thereof, a plurality of magnetizable laminations encircling corresponding current paths of a plurality of said bus bars, each of said laminations having lugs extending inwardly between adjacent bus bars, and means including a plurality of magnetizable laminations encircling the remaining current paths for tripping said circuit breaker.

14. In a circuit interrupter, a support, a stationary contact block on one side of said support, a plurality of spaced conductors having corresponding ends integrally secured to said block and extending outwardly from the opposite side of said support, each of said conductors having an elongated slot dividing an intermediate portion thereof into parallel current paths, a plurality of U-shaped magnetizable laminations encircling corresponding current paths, each of said laminations having lugs extending inwardly between adjacent conductors, means for pressing said laminations together and against one side of said support, and magnetizable laminations on the opposite side of said support and encircling the remaining current paths.

15. In a circuit interrupter, a support, a stationary contact block on one side of said support, a plurality of spaced conductors, having corresponding ends integrally secured to said block and extending outwardly from the opposite side of said support, each of said conductors having an elongated slot dividing an intermediate portion thereof into parallel current paths of substantially different conductance, a plurality of U-shaped magnetizable laminations encircling corresponding current paths of higher conductance, each of said laminations having lugs extending inwardly between adjacent conductors, means for pressing said laminations together and against one side of said support, and magnetizable laminations on the opposite side of said support and encircling said current paths of lower conductance.

16. In a circuit interrupter, a support, a stationary contact block on one side of said support, a plurality of spaced conductors having corresponding ends integrally secured to said block and extending outwardly from the opposite side of said support, each of said conductors having an elongated slot dividing an intermediate portion thereof into parallel current paths of substantially different conductance, a plurality of U-shaped magnetizable laminations encircling corresponding current paths of higher conductivity, each of said laminations having lugs extending inwardly between adjacent conductors, means for pressing said laminations together and against one side of said support, magnetizable laminations on the opposite side of said support and encircling the remaining current paths for producing an attractive effort proportional to the current flowing in said path of lower conductance, and a tripping member subject to said attractive effort for tripping the interrupter.

17. In a circuit interrupter, a support, a stationary contact block on one side of said support, a plurality of spaced conductors having corresponding ends integrally secured to said block and extending outwardly from the opposite side of said support, each of said conductors having an elongated slot dividing an intermediate portion thereof into parallel current paths of substantially different conductance, a plurality of U-shaped magnetizable laminations encircling corresponding current paths of higher conductivity, each of said laminations having lugs extending inwardly between adjacent conductors, means for pressing said laminations together and against one side of said support, magnetizable laminations on the opposite side of said support and encircling the remaining current paths for producing an attractive effort proportional to the current flowing in said path of lower conductance, a tripping member subject to said attractive effort for tripping the interrupter, and means for adjusting the magnitude of said attractive effort effective initially to move said tripping member.

18. In a circuit interrupter, a support, a stationary contact block on one side of said support, a plurality of spaced conductors, having corresponding ends integrally secured to said block and extending outwardly from the opposite side of said support, each of said conductors having an elongated slot dividing an intermediate portion thereof into parallel current paths of substantially different conductance, a plurality of U-shaped magnetizable laminations encircling corresponding current paths of higher conductance, each of said laminations having lugs extending inwardly between selected adjacent conductors to predetermine the inductance of said laminations, means for pressing said laminations together and against one side of said support, and magnetizable laminations on the opposite side of said support and encircling said current paths of lower conductance.

19. An electroresponsive device comprising a plurality of flat conductors, a contact member having a plurality of spaced recesses receiving the ends of said conductors, said conductors having aligned and elongated slots intermediate the ends thereof for dividing said conductors into two current paths, one divided portion of each of said conductors having adjacent one end of its slot inwardly extending recesses, and a plurality of U-shaped magnetizable laminations having inwardly extending projections receivable by said recesses, said projections having widths substantially equal to the distance between said spaced conductors and receivable therebetween.

20. An electroresponsive device comprising a plurality of flat conductors, a contact member having a plurality of spaced recesses receiving the ends of said conductors, said conductors having aligned and elongated slots intermediate the ends thereof for dividing said conductors into two current paths, the conductor portions of one current path having adjacent one end of said slots inwardly extending recesses, and a plurality of U-shaped magnetizable laminations having inwardly extending projections receivable by said recesses, said projections having widths substantially equal to the distance between said spaced conductors and receivable therebetween, and clamping means for said laminations.

21. An electroresponsive device comprising a plurality of flat conductors, a contact member having a plurality of spaced recesses receiving the ends of said conductors, said conductors having aligned and elongated slots intermediate the ends thereof for dividing said conductors into two current paths, the conductor portions of one current path having adjacent one end of said slots inwardly extending recesses, and a plurality of U-shaped magnetizable laminations having inwardly extending projections receivable by said recesses, said projections having widths substantially equal to the distance between said spaced conductors and receivable between selected adjacent conductors, a plurality of said laminations extending inwardly from opposite sides of said spaced conductors and respectively embracing a portion of said current paths and together forming a substantially closed magnetic circuit about said corresponding current paths, opposite ends of said elongated slot terminating in upwardly extending recesses, a magnetic core formed of U-shaped magnetizable laminations nesting within said last-named recess and partially encircling said other of said corresponding paths, and an adjustable armature operatively associated with said core.

22. In combination, an assembly of a plurality of flat conductors spaced laterally one from the other by predetermined amounts, means responsive to the rate of rise of current for opposing current flow through said conductors comprising complementary magnetizable structures slidable from opposite sides of said assembly toward each other to form a substantially closed magnetic circuit about said assembly, said conductors having a plurality of aligned recesses along opposite edges thereof, and lugs integral with said structures and movable therewith through said recesses, and upon displacement of said structures axially of said conductors movable between selected conductors mechanically to interlock said magnetizable structures and said conductors.

23. In combination, an assembly of a plurality of flat conductors spaced laterally one from the other by predetermined amounts, means responsive to the rate of rise of current for opposing current flow though said conductors comprising complementary magnetizable structures slidable from opposite sides of said assembly toward each other to form a substantially closed magnetic circuit about said assembly, said conductors having a plurality of aligned recesses along opposite edges thereof, and lugs, one opposite the other, integral with said structures and movable therewith through said opposed recesses, and upon displacement of said structures axially of said conductors movable between selected adjacent conductors mechanically to interlock together, and to prevent relative movement between, said conductors and said structures.

24. In combination, an assembly of a plurality of flat conductors spaced laterally one from the other by predetermined amounts, means responsive to the rate of rise of current for opposing current flow through said conductors comprising a plurality of U-shaped magnetizable laminations each provided with inwardly extending lugs adjacent the open ends thereof, said conductors having aligned recesses extending inwardly from opposite edges thereof and through which said lugs are slidable to predetermine the air gap between laminations assembled from opposite sides of said assembly, each of said lugs upon displacement of said laminations axially of said conductors, nesting in interlocking relation between adjacent conductors, and means for pressing said laminations together in positions fixed with respect to said conductors and removed from said aligned recesses.

25. In combination, an assembly of a plurality of flat conductors rigidly spaced laterally one from the other by substantially equal amounts, a plurality of U-shaped magnetizable laminations the respective legs of which, from opposite sides of said assembly, extend over opposite edges of said conductors to embrace a predetermined number thereof and to form a partially complete magnetic circuit about said assembly, each of said laminations having interlocking lugs extending inwardly and between adjacent conductors, means for adjusting the positions of said laminations comprising complementary recesses extending inwardly from opposite edges of said conductors and through which said lugs of individual laminations are slidable, and means axially displaced from said recesses for clamping said laminations together.

26. In combination, an assembly of conductors, means rigidly spacing said conductors one from the other, complementary U-shaped magnetizable structures extending from opposite sides of said assembly and partially embracing said assembly to form, with an air gap therebetween, a magnetic circuit around said assembly, said structures including means for mechanically interlocking said structures with said conductors to predetermine the extent of said air gap and to prevent decrease in the size of said air gap by movement of said structures in directions normal to the longitudinal axis of said conductors.

WILLIAM M. SCOTT, Jr.